Jan. 6, 1953     A. C. KRACKLAUER     2,624,465
HORIZONTAL PLATE FILTER
Filed May 6, 1950
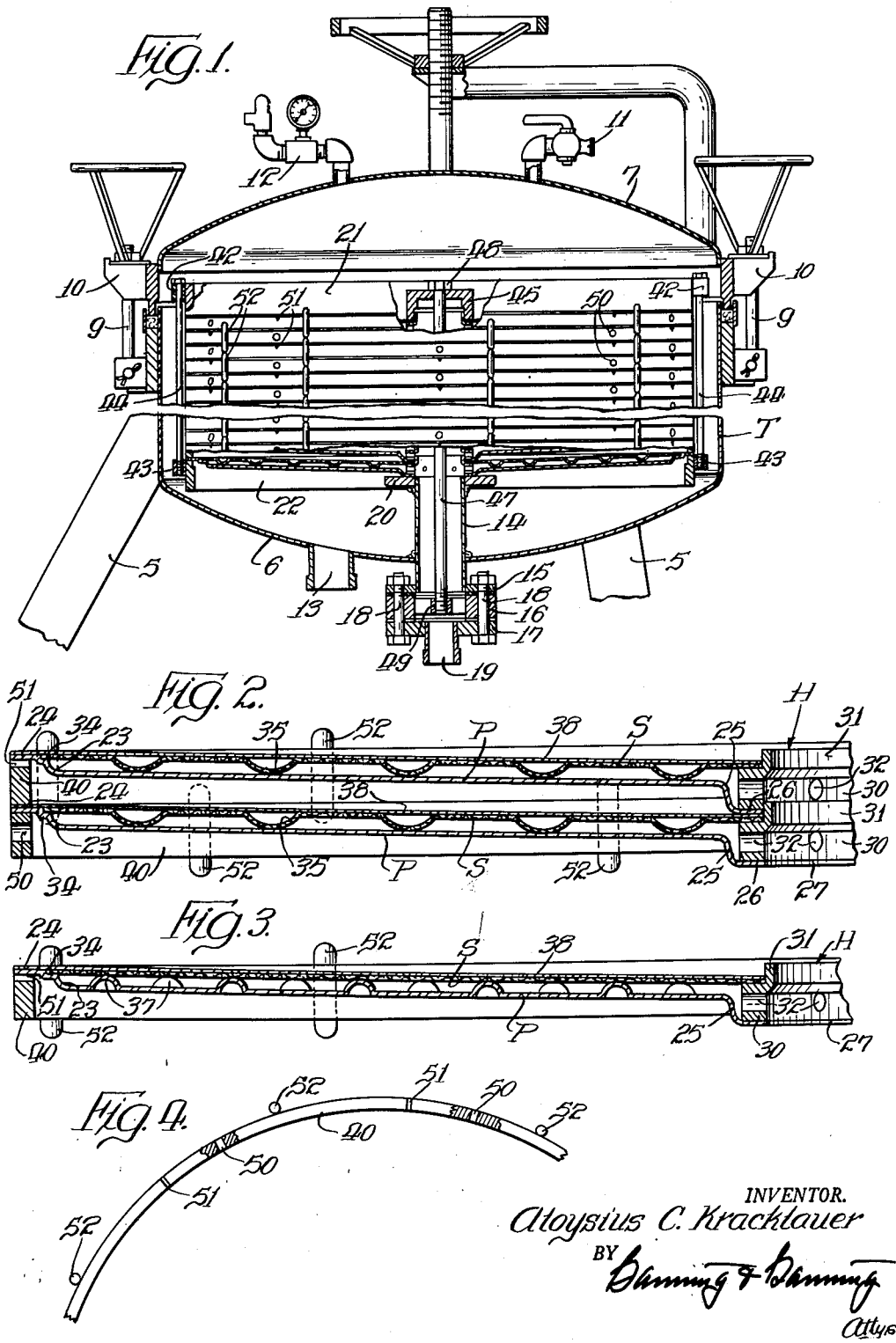
INVENTOR.
Aloysius C. Kracklauer
BY Banning & Banning
Attys.

Patented Jan. 6, 1953

2,624,465

UNITED STATES PATENT OFFICE 2,624,465

HORIZONTAL PLATE FILTER

Aloysius C. Kracklauer, Mundelein, Ill.

Application May 6, 1950, Serial No. 160,443

7 Claims. (Cl. 210—185)

This invention relates to a filter of the type in which a plurality of horizontal filter units are assembled into a tier within a cylindrical tank, with provision for liquid to circulate through the filtering media thereof and into a central column for gravity outflow therethrough. The present filter is designed primarily for industrial use, and is effective for the clarification of various liquids, and for the separation of solid particles contained in liquid vehicles which may be of many different kinds—acids, oils, syrups, wines, varnishes, being examples.

The features of improvement which characterize the present filter are concerned, inter alia, with a specially formed spacer ring which is fitted between adjacent filter units at their outer margins; with means carried by the spacer ring and extended vertically therefrom to serve as guides by which to maintain the proximate filter units in vertical alignment; and with means by which air trapped between the filter units may escape outwardly through the spacer rings into the body of the liquid at points adjacent the walls of the tank to ascend therethrough to a dome at the top of the tank for escape therefrom through a valve-controlled vent provided for this purpose.

These and other features, as will hereinafter appear, constitute certain aspects of my present invention of which a suggestive embodiment is illustrated in the accompanying drawing wherein—

Figure 1 is a central vertical section through the filter apparatus in its entirety;

Fig. 2 is an enlarged fragmentary section diametrically of two filter units and associated parts;

Fig. 3 which is a similar view shows a filter unit having a slightly modified construction; and Fig. 4 is a fragmentary detail of the spacer ring which separates adjacent filter plates at their outer margins.

In the construction shown, there is a cylindrical tank T supported on legs 5 and having a downwardly dished bottom 6 and a removable dome top 7 which may be secured firmly in place by bolts 9 pivoted to the tank and engaging with lugs 10 outstanding from the top. A valve-controlled vent 11 and a pressure-registering gauge 12 are mounted on the top, as shown. Such a construction is common at the present time and needs no further description.

An inlet pipe 13 is connected to the tank bottom, eccentrically thereof, for delivery thereinto of the liquid which is to be filtered. The discharge opening of the tank is through an axial column 14 which is anchored to the bottom 6 and passes therethrough to carry at its lower end a fixed ring 15. Below this ring and coaxial therewith is a spider 16, and therebelow a second ring 17 through which pass bolts 18 for securing the two rings 15 and 17 and spider 16 in unitary relation. Depending from the lower ring 17 is a drain outlet 19 so that liquid descending through the column 14 and through the spider will pass out through the outlet 19. At its upper end the column 14 carries a head 20 which is fixedly joined thereto as by welding.

The construction thus far described is concerned with the tank, its top, and its inlet and its outlet. There remains to be considered the filter apparatus which operates within such a tank and which comprises essentially a head ring 21, a base ring 22, and an assembly of superposed filter units therebetween. These filter units of which the number is variable according to the size and capacity of the tank are interconnected as a unit; since they are all alike, a description of but one will suffice.

Referring now to Fig. 2 each filter unit comprises an imperforate circular plate P having in its peripheral portion an upward offset 23 beyond which it proceeds horizontally in the form of an outer ledge 24. The body of the plate is inclined downwardly slightly toward the center where it is formed with a downward offset 25 to provide an inner ledge 26 surrounding a large central aperture 27. Each plate supports on its inner ledge 26 a hub H having a body 30 with an upstanding inwardly offset neck 31. Through the hub body is formed a plurality of spaced radial openings 32, and the bottom end of this body is rested on the inner ledge 26 of one plate to furnish a support at its top end for the inner ledge of the next adjacent plate thereabove.

Each hub body also furnishes support for the inner peripheral portion of an associated apertured plate S which is perforated and may possibly take the form of a screen, and will be so referred to hereinafter. The outer peripheral portion of this screen is rested on a shouldered seat 34 just inwardly of the outer ledge 24 of the plate P for holding the screen against lateral movement on the imperforate plate. This screen is maintained spaced from its supporting plate by a distance that is substantially uniform at every point, and to accomplish this end the screen is embossed downwardly at intervals between its inner and outer margins to provide dimples 35 which rest upon the filter plate. These dimples are desirably arranged in a pattern equidistantly apart, thereby to furnish support for the screen at desired points throughout the entire area of the screen.

In Fig. 3 I have shown a modification in the spacing means between the plate P and screen S, the construction of the filter unit being otherwise the same as that already described. According to Figure 3 it is the imperforate plate P that is embossed upwardly at intervals to provide dimples 37 which engage the underside of the screen which is uniplanar throughout. Whether made according to the construction of Fig. 2 or Fig. 3, the screen supports upon its top face a filtering medium 38 such as a fine mesh cloth or filter paper capable of separating out the solids from the liquid which is passed therethrough, and removing from the treated liquid various ones of its properties or constituents which may be undesirable to retain. Filtering mediums of this kind are well known, and no claim thereto per se is herein made.

Each filter unit supports upon its top face a spacer ring 40 having a diameter substantially the same as its imperforate plate P and an axial length the same as the body 30 of one of the hubs H. The adjacent filter unit which is supported upon this ring will then be spaced from the filter unit therebelow a uniform distance at every point. The inner peripheral portion of each screen S is rested upon the top of the body 30 of one of the hubs H, the distance of its separation from the ledge 26 of the associated plate P being the same as the axial length of the spacer ring at its outer ledge. The hubs are arranged one above the other to provide a column whose adjacent sections engage the top face of the inner ledge 26 of one plate P and the under face of the inner peripheral portion of the screen S in the same filter unit. By this arrangement of filter units supported in spaced relation at their inner and outer margins, and also therebetween, I provide an operative assembly of the height desired for reception within the tank T.

The lowermost filter unit is rested on the base ring 22, and upon the topmost filter unit is rested the head ring 21. Each of these rings is provided with a plurality of apertured lugs 42 and 43, respectively, and when the rings are rotatively adjusted to the correct position these lugs will be disposed oppositely of each other to receive therebetween connecting bolts 44. The head of each bolt will abut one lug and its opposite end portion will engage screw threads of the other so that, when all the bolts are tightened, the several filter units therebetween will be compressed in the regions of their outer margins. This operation of assembling the filter units, and also of disassembling for purposes of cleaning, repair or replacement, will ordinarily take place outside the tank T, the entire structure of interconnected units being removed or restored for this purpose with the aid of a suitable hoist (not shown). When installed in the tank a cap 45 is fitted over the hub H of the topmost filter unit to provide a closure for the top end of the sectional column. Through this cap is extended a bolt 47 whose head 48 remains engaged therewith, the bolt passing axially through the column to connect with a screw-threaded hub 49 which is carried fixedly by the spider 16. When so engaged, the axial bolt 47 is rotatively advanced to compress the filter units in the region of their inner margins and to lock the assembled structure fixedly in place within the tank upon the supporting head 20 that is provided for this purpose.

The spacer rings 40 are of special construction in that each is provided at spaced intervals with ports 50 and therebetween upon its top edge with radial channels 51. In addition, each spacer ring carries at spaced intervals a vertical guide pin 52 whose opposite ends are extended above and below the spacer ring (see Figs. 2 and 3). The protruding end portions of the guide pins are arranged to engage the outer faces of the spacer rings above and below the ring which carries them. Since each spacer ring is desirably equipped with a plurality of such pins, when assembly takes place, each filter unit will be guided to a position coaxially of the others and be there maintained against lateral shifting movement.

In use, liquid entering through the inlet 13 ascends within the tank T well toward its top; it then passes inwardly through the ports 50 of the spacer rings 40 to enter into the spaces between adjacent filter units. Here the liquid is free to descend through each filtering medium 38 carried on the top face of the screen S within the narrow circular space between the two adjacent filter units. After the filtered liquid has passed through to the underside of the screen S it advances by gravity toward and through the ports 32 and thence downwardly through the sectional column for eduction through the outlet 19. The circuit is therefore one which requires the liquid in every case to advance inwardly into the spaces between adjacent filter units, then pass through the filtering mediums thereof, and then drain into the central column for discharge through the drain outlet of the apparatus. In the course of repeated operations a filter cake will tend to accumulate on the filtering mediums so as to impair the operation of the apparatus. Periodically these operations are stopped while the dome top is removed and, with the aid of a hoist, the entire assembly of interconnected filter units is removed to be then disassembled for purposes of cleaning, and perhaps of replacing the filtering mediums. The operation is one which is simple and may be performed expeditiously at periods which vary in length according to the nature and condition of the liquid under treatment.

With certain liquids such, for example, as beer in the making, there may be some gas entrapped in the fluid. This should be permitted to escape without remaining in the body of the liquid as it proceeds through the circuit required for filtering. In the present apparatus this escape is readily accomplished by reason of the upward and outward inclination of the imperforate plates P which adjacent their outer margins are offset upwardly to provide outer ledges which rest upon the top faces of the spacer rings 40, and by the transverse channels which are provided in the top faces of such spacer rings whereby to permit free outward movement of the gas or air so entrapped in the liquid. The entrapped air is then free to ascend through the body of the liquid adjacent the walls of the tank and up to the dome at the top where it may escape through the valve-controlled vent 11.

I claim:

1. In combination with a cylindrical tank having an inlet and a sectional tubular column extending upwardly through the tank bottom and axially therewithin and provided at its base with an outlet therefrom, an assembly of superposed filter units each having a central aperture with whose adjacent marginal portions the column sections are interengaged, means interconnecting the assembly of filter units into a unitary structure capable of removal from and replacement in the tank, and a guide fixed to the outer margin of each filter unit and extending vertically above and below the filter unit slidably to contact the outer margins of adjacent filter units to guide filter units into place in assembling the same and for maintaining the entire assembly of filter units in vertical alignment.

2. In combination with a cylindrical tank having an inlet and a tubular column extending upwardly through the tank bottom and axially therewithin and provided at its base with an outlet therefrom, an assembly of superposed filter units each having a central aperture through which the tubular column is extended when the assembly of filter units is operatively positioned within the tank and with whose interior each filter unit is in communication when so positioned, and a guide fixed to the outer margin of each filter unit and extending vertically above and below the filter unit slidably to contact adjacent filter units to guide filter units into place in assembling the same and for maintaining the entire assembly of filter units in vertical alignment.

3. In combination with a cylindrical tank having an inlet and a tubular column extending upwardly through the tank bottom and axially therewithin, and provided at its base with an outlet therefrom, an assembly of superposed filter units having aligned central apertures through which the column is extended when the filter unit assembly is operatively positioned within the tank, means establishing communication between each filter unit and the interior of the column, means interconnecting the assembly of filter units into a unitary structure for removal from or installation in the tank, and a guide fixed to the outer margin of each filter unit extending vertically above and below the filter unit slidably to contact the adjacent filter units to guide filter units into place in assembling the same and for maintaining the entire assembly of filter units in vertical alignment.

4. In combination with a cylindrical tank having an inlet and a tubular column extending upwardly through the tank axially therewithin and provided at its base with an outlet therefrom, an assembly of supported filter units having aligned central apertures through which the column is extended when the filter unit assembly is operatively positioned within the tank, means establishing communication between each filter unit and the interior of the column, a spacer ring disposed between adjacent filter units at their outer margins and having ports for the inward passage of liquid, and vertical guide pins secured to the outer side of the spacer ring and projecting upwardly and downwardly slidably to contact the outer side of the spacer ring associated with adjacent filter units when assembly takes place whereby each filter unit will be guided to a position coaxially of the others and be there maintained against lateral shifting movement.

5. A filter apparatus comprising a cylindrical tank having an inlet, a plurality of superposed, centrally apertured, and interconnected filter units positioned within the tank coaxially thereof, each unit comprising an imperforate plate and, spaced upwardly therefrom, a screen whereon is rested a filtering medium, means on the imperforate plate forming a shouldered seat for reception of the marginal portion of the screen for holding said screen against lateral movement on the imperforate plate, the imperforate plate being inclined upwardly and outwardly to facilitate the escape of gas or air entrapped in the liquid and direct liquid downwardly and inwardly toward the central portion of the imperforate plate, a spacer ring disposed between adjacent filter units proximate to their outer margins, there being formed through each spacer ring a plurality of ports for the inward passage of liquid and a plurality of transverse channels across its top face permitting the free outward movement and escape of gas or air entrapped in the liquid, a sectional column extended vertically axially of the tank and of the superposed filter units, means providing a connection between each filter unit and the sectional column whereby to support the former at its inner margin, means providing communication between each filter unit and the column, and an outlet in communication with the column at the base thereof.

6. A filter apparatus comprising a cylindrical tank having an inlet, a sectional tubular column extending upwardly through the tank bottom and axially therewithin and provided at its base with an outlet therefrom, a plurality of centrally apertured, superposed filter units surrounding the column and in communication with the interior thereof, each filter unit being interengaged with the sectional column to receive support therefrom adjacent its inner margin, a spacer ring extended between adjacent filter units proximate to the outer margins thereof and provided between its upper and lower faces with inlet ports therethrough for the inward passage of liquid, a head ring overlying the topmost filter unit and a base ring underlying the lowermost filter unit, each in engagement therewith, means adjustably interconnecting the head and base rings for applying an axial compressive force to the filter units therebetween at points adjacent their outer margins, a cap at the top of the column providing a closure therefor, a device anchored within the column axially thereof near its base, adjustable means interconnecting the cap and the axial device for applying compressive force to the filter units at points adjacent their central apertures, each filter unit comprising an imperforate plate upwardly inclined toward its outer periphery to facilitate the escape of gas or air entrapped in the liquid and direct liquid downwardly and inwardly toward the central portion of the imperforate plate and the spacer ring being provided with a plurality of channels crosswise of its top face whereby gas entrapped within the liquid between adjacent filter units is free to move outwardly and upwardly past the spacer ring and through the cross channels thereof into the body of liquid within the tank for escape through a vent at the top thereof.

7. A filter apparatus comprising a cylindrical tank having an inlet, a sectional tubular column extending upwardly through the tank bottom and axially therewithin and provided at its base with an outlet therefrom, an assembly of superposed filter units each having a central aperture with whose adjacent marginal portions the column sections are interengaged, each filter unit comprising an imperforate plate inclined upwardly and outwardly to facilitate the escape of gas or air entrapped in the liquid and direct liquid downwardly and inwardly toward the central portion of the imperforate plate and near its outer margin being offset upwardly to provide an outer margin whose top face is formed with a shouldered seat, a screen carried by the imperforate plate and resting within the seat thereof for centering relative thereto, the shoulder of the seat holding the screen against lateral movement on the imperforate plate, a plurality of spaced means extending between the screen and plate and integral with one and in engagement with the other for maintaining the screen and plate in uniformly spaced-apart relation, a spacer ring disposed between adjacent filter units at their outer margins and formed with cross channels in their top faces for escape of entrapped gas within the space between two adjacent filter units, adjustable means interconnecting the assembly of filter units adjacent their outer margins, and other adjustable means interconnecting the tank with the filter units adjacent their inner margins whereby to lock the entire assembly thereof in a fixed position therewithin.

ALOYSIUS C. KRACKLAUER.

REFERENCES CITED

The following references are of record in the file of this patent:

UNITED STATES PATENTS

| Number | Name | Date |
|---|---|---|
| 209,874 | Enzinger | Nov. 12, 1878 |
| 444,483 | Breyer | Jan. 13, 1891 |
| 515,768 | Harris | Mar. 6, 1894 |
| 984,705 | Rarick | Feb. 21, 1911 |
| 1,410,017 | Kessler | Mar. 21, 1922 |
| 2,278,453 | Kracklauer | Apr. 7, 1942 |
| 2,313,612 | Alsop | Mar. 9, 1943 |
| 2,336,021 | La Brecque | Dec. 7, 1943 |
| 2,345,014 | Stamsvik | Mar. 28, 1944 |
| 2,452,486 | O'Meara | Oct. 26, 1948 |

FOREIGN PATENTS

| Number | Country | Date |
|---|---|---|
| 2,072 | Great Britain | 1900 |
| 69,781 | Germany | July 19, 1893 |